United States Patent [19]
Roberts et al.

[11] Patent Number: 5,621,970
[45] Date of Patent: Apr. 22, 1997

[54] METHOD FOR POSITIONING A WING PANEL FOR RIVETING

[75] Inventors: Bradley M. Roberts, Williamsville; James J. Birke, North Tonawanda; Joseph Dionne, West Seneca; Kurt R. Kubanek, Tonawanda, all of N.Y.

[73] Assignee: Gemcor Engineering Corp., Buffalo, N.Y.

[21] Appl. No.: 465,727

[22] Filed: Jun. 6, 1995

Related U.S. Application Data

[62] Division of Ser. No. 241,352, May 11, 1994.

[51] Int. Cl.⁶ .................................................. B23P 11/02
[52] U.S. Cl. .................. 29/897.2; 29/407.01; 29/407.09; 29/431; 29/525.06
[58] Field of Search ................................... 29/897.2, 407, 29/431, 464, 468, 525.2, 701, 702, 703, 714, 243.53, 281.4, 407.01, 407.09, 525.06; 269/20, 24, 290, 296; 254/93 R, 93 L, 89 H

[56] References Cited

U.S. PATENT DOCUMENTS

| | | | |
|---|---|---|---|
| 3,536,316 | 10/1970 | deVoss | 269/61 |
| 3,776,300 | 12/1973 | Fismer | 254/93 L |
| 4,310,964 | 1/1982 | Murphy | 29/703 |
| 4,328,951 | 5/1982 | Laupper | 254/89 H |
| 4,662,556 | 5/1987 | Gidlund | 227/69 |
| 4,771,221 | 9/1988 | Finkbeiner | 254/89 H |
| 4,821,408 | 4/1989 | Speller, Sr. et al. | 29/701 |
| 4,864,702 | 9/1989 | Speller, Sr. et al. | 29/34 B |
| 4,966,323 | 10/1990 | Speller, Sr. et al. | 227/51 |
| 4,967,947 | 11/1990 | Sarh | 227/52 |
| 4,999,896 | 3/1991 | Mangus et al. | 29/34 B |
| 5,060,362 | 10/1991 | Birke et al. | 29/525.2 |
| 5,105,515 | 4/1992 | Nelson | 29/281.4 |
| 5,142,764 | 9/1992 | Whiteside | 29/525.2 |

*Primary Examiner*—David P. Bryant
*Attorney, Agent, or Firm*—Hodgson, Russ, Andrews, Woods & Goodyear LLP

[57] ABSTRACT

Apparatus and method for positioning a wing panel or other member for riveting or conducting other operations thereon. The member is loaded at floor level on a plurality of hydraulic cylinders spaced over the length thereof and raised to a position for conducting the operations thereon. The hydraulic fluid flow to and from the hydraulic cylinders is controlled to synchronize the movements of the cylinder piston rods so that each of the piston rods bears its share of the load throughout raising and lowering of the member. The cylinders are also individually operated to accommodate passage of riveting machine heads or other tooling relative to the member.

7 Claims, 5 Drawing Sheets

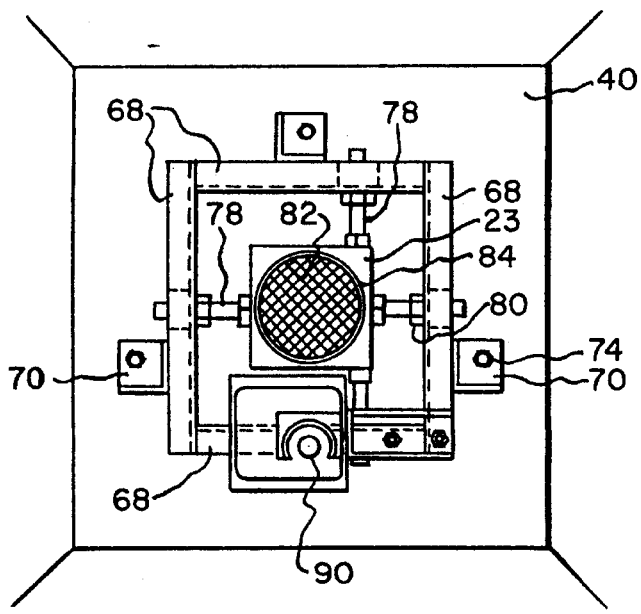
Fig. 4.
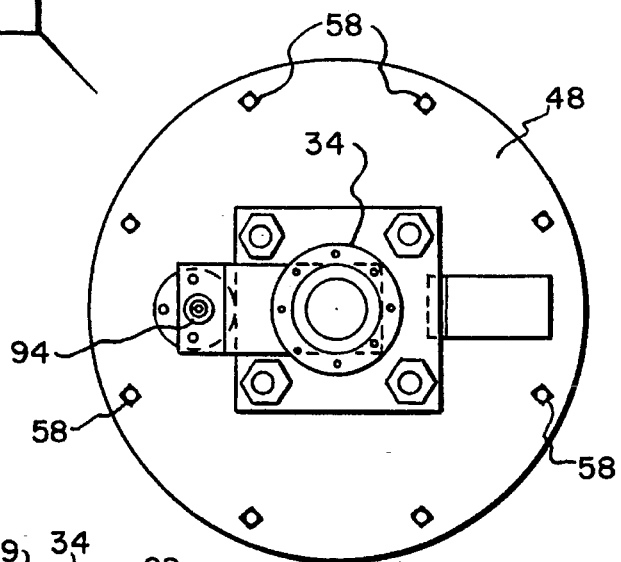
Fig. 6.
Fig. 5.
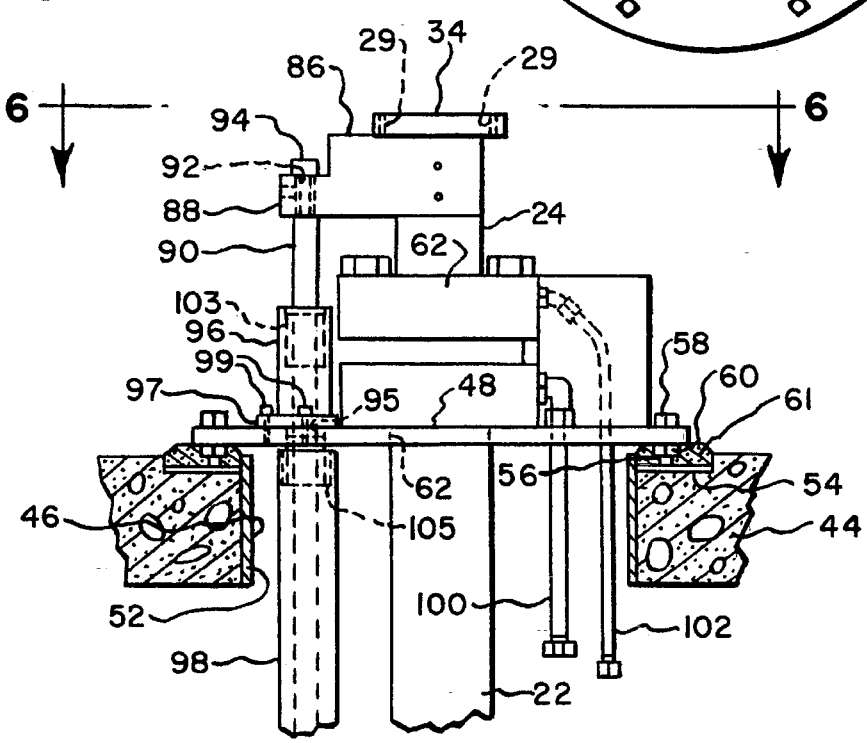

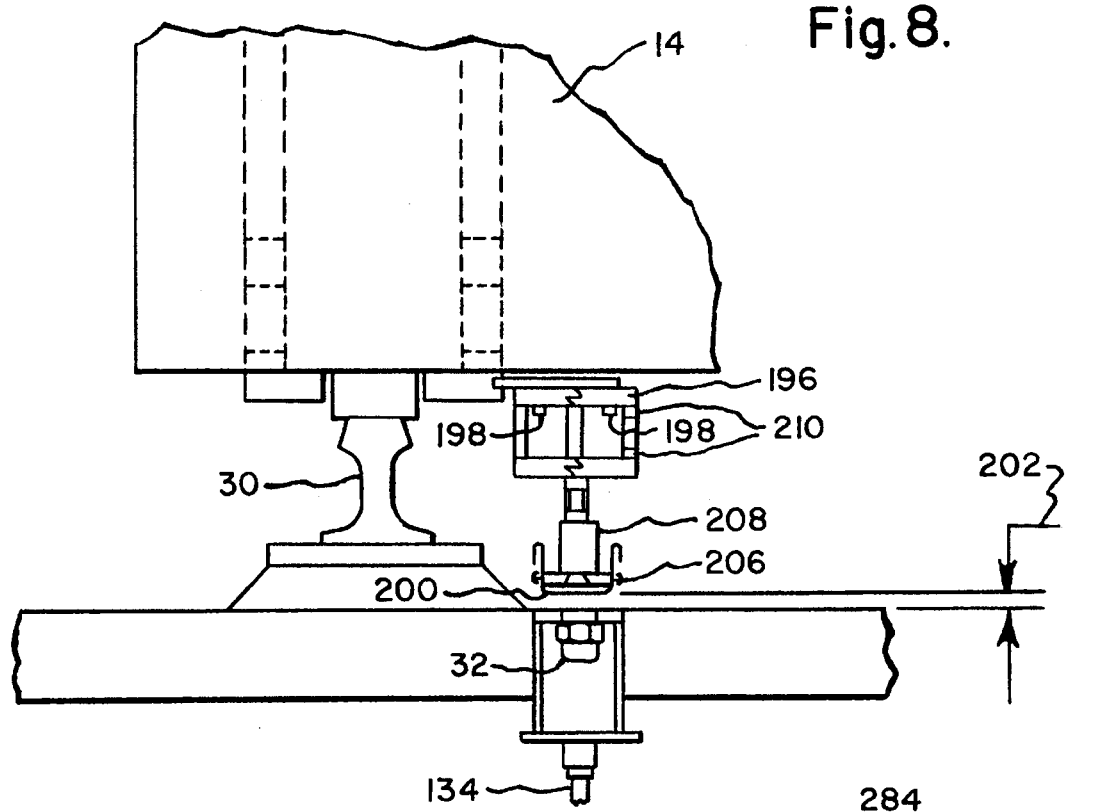
Fig. 8.
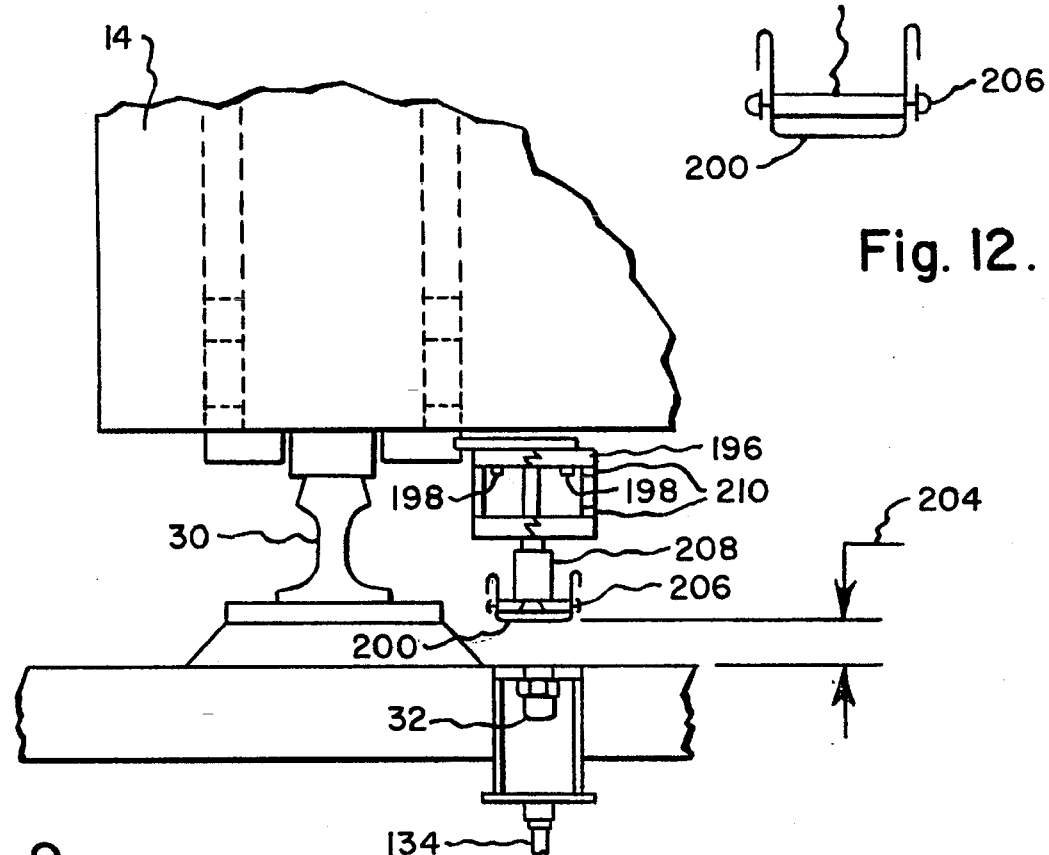
Fig. 12.
Fig. 9.

METHOD FOR POSITIONING A WING PANEL FOR RIVETING

This application is a divisional of application Ser. No. 08/241,352, filed May 11, 1994.

The present invention relates generally to apparatus for positioning elongated workpieces such as wing panels for conducting riveting and other operations thereon.

During the manufacture of aircraft wings, thin elongated wing skins or panels are produced which are thereafter strengthened by riveting thereto a plurality of previously tacked stringers which extend longitudinally on the wing skins. During the riveting process, a riveting machine traverses the length of the wing panel while riveting a stringer individually thereto, and traverses the width of the wing panel for positioning to traverse the wing panel length for riveting of each additional stringer.

The thin wing skin is very susceptible to loss of geometry and must therefore be adequately supported during the riveting process.

U.S. Pat. No. 4,966,323 to Speller, Sr. et al, which is assigned to the assignee of the present invention and which is incorporated herein by reference, discloses a wing skin disposed vertically in a fixture wherein a series of closely spaced horizontally disposed previously tacked stringers are to be riveted to the wing panel. The riveting apparatus illustrated in that patent comprises a frame having a pair of spaced apart sides movable along the supporting surface and straddling the workpiece and having riveting tools on first and second heads on carriages on opposite sides of the workpiece for performing the riveting operations. Other patents illustrating the state of the art include U.S. Pat. Nos. 3,546,316; 4,662,556; 4,864,702; and 4,967,947.

It is an object of the present invention to inexpensively and easily suitably support a thin workpiece such as a wing panel susceptible to loss of geometry in position for performing operations such as riveting thereon by tool heads positioned on both sides of the workpiece.

It is another object of the present invention to easily and safely load the workpiece at floor level and raise the workpiece to a level for performing the operations thereon and thereafter lower the workpiece while supporting the workpiece throughout the raising and lowering thereof so as to prevent loss of geometry.

It is a further object of the present invention to provide apparatus therefor which is rugged, reliable, inexpensive, and easy to operate.

In order to efficiently and effectively position a workpiece for riveting or conducting other operations thereon while supporting the workpiece over the entirety of its length so as to prevent loss of geometry, in accordance with the present invention a plurality of spaced hydraulic cylinders are provided along the length of the workpiece for raising the workpiece from a first or lower position at which it is loaded thereon to a second or higher position at which one or more operations are to be conducted thereon and for lowering the workpiece back to the first position. The apparatus includes means for controlling hydraulic fluid flow to and from the hydraulic cylinders for synchronizing the movements of the cylinders so that each of the pistons bears its share of the workpiece load throughout the raising and lowering of the workpiece. There is also provided individual operation of the cylinders to accommodate passage of tooling relative to the workpiece.

The above and other objects, features, and advantages of the present invention will be apparent in the following detailed description of the preferred embodiments thereof when taken in conjunction with the accompanying drawings wherein the same reference numerals denote the same or similar parts throughout the several views.

BRIEF DESCRIPTION OF THE DRAWINGS

FIG. 4 is a sectional view of the cylinder taken along lines 4—4 of FIGS. 2 and 3.

FIG. 5 is a side view of the cylinder taken along lines 5—5 of FIG. 2.

FIG. 6 is a top view of the cylinder, i.e., taken along lines 6—6 of FIG. 5.

FIG. 8 is a side view of a portion of the riveting machine showing means for sensing the location of the riveting machine relative to the wing panel support cylinder.

FIG. 9 is a view similar to that of FIG. 8 showing the sensing means in an inoperative position.

FIG. 12 is a detail schematic view of a portion of the sensing means of FIGS. 8 and 9.

DETAILED DESCRIPTION OF THE PREFERRED EMBODIMENT

Figure 1:
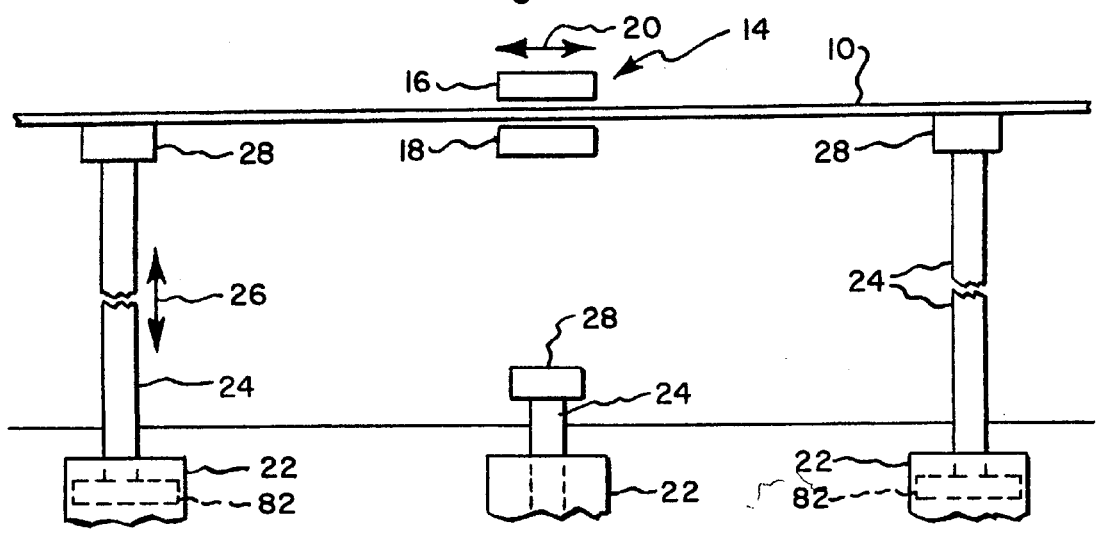
FIG. 1 is a schematic view of apparatus including riveting machine heads and a plurality of hydraulic cylinders which embodies the present invention in the process of riveting a stringer to a wing panel.
Figure 2:
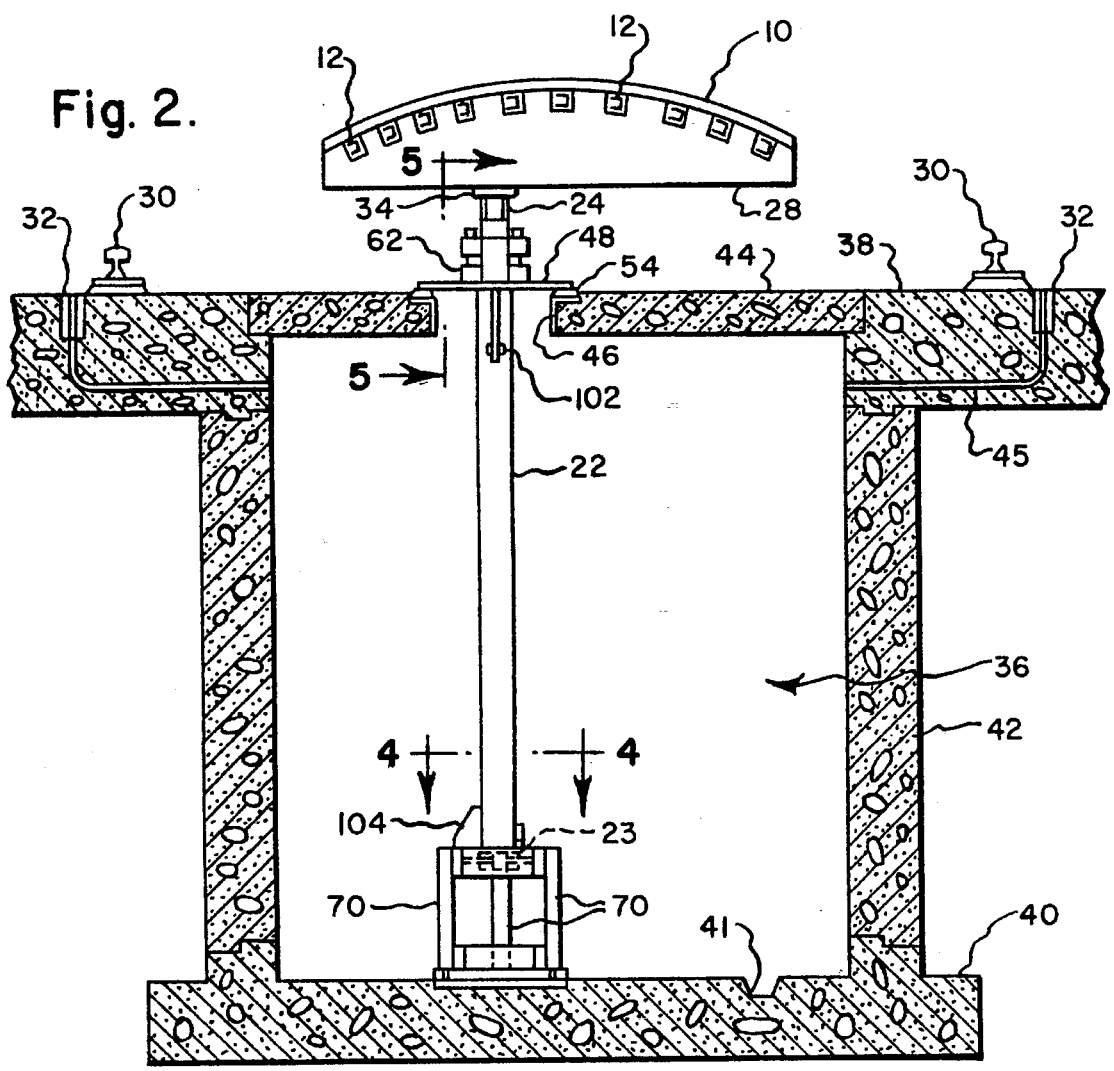
FIG. 2 is a side view of one of the hydraulic cylinders of FIG. 1 within a pit, which is shown in cross-section.

Referring to FIGS. 1 and 2, there is illustrated at 10 a thin elongated wing panel, which is typically milled aluminum skin. A plurality of transversely spaced elongated stiffening stringers 12 extending spanwise on the wing panel are tacked to the wing panel 10. A common operation during manufacture of a wing is to rivet the tacked stringers 12 to the wing panel 10. In order to perform such a riveting function, a riveting machine, illustrated diagrammatically at 14, positions a tooling head 16 above the wing panel 10 and another tooling head 18 below the wing panel 10 and traverses the length of each of the stringers 12 individually, as illustrated at 20, riveting the stringer 12 to the wing panel 10. In accordance with the present invention, the wing panel 10 is held in a horizontal position for such an operation, the riveting machine 14 making a pass longitudinally on the wing panel for each of the stringers. It should be understood that the present invention is not limited to the riveting of wing panels, but is also applicable to various other operations performed on various other kinds of workpieces.

Since a thin wing panel is susceptible to loss of geometry, it must be supported in such a way as to minimize the deflection throughout the entire length thereof. The wing panel load is borne by a plurality of cylinders 22, for example, seventeen in number, spaced over the wing panel length. Three such cylinders 22 are shown in FIG. 1. The cylinder spacing may vary depending on wing panel support requirements along the length thereof. Thus, the cylinders 22 may be spaced closer together at locations along the wing panel length where there is more contour or mass to the wing panel. The cylinders 22 contain pistons 82 which effect raising and lowering of suitably attached piston rods 24, as illustrated at 26, which support formers 28. Formers 28 are constructed to conform to the wing panel contour and are notched to receive the stringers. The upper ends of the piston rods are suitably attached to the formers such as by means of flange members 34 suitably attached to the piston rods and by bolts or screws (not shown) received in the apertures 29 therein, as shown in FIG. 5. The formers 28 extend transversely across the wing panel 10 for support thereof. The formers are individually constructed to conform to the wing panel shape at each respective position along the length thereof. The wing skin with the stiffeners tacked thereto thus rests on the several longitudinally spaced formers for riveting. The formers are constructed to take into consideration that the piston rods all extend fully to the same height at which point they are locked in position by the latch mechanism 62.

The riveting machine 14 moves longitudinally along the wing panel 10 on tracks 30 (FIGS. 8 and 9) supporting the tooling heads 16 and 18 above and below the wing panel 10 respectively for riveting thereof. Suitable riveting apparatus for such use is described in U.S. Pat. Nos. 4,999,896 and 5,060,362, which are assigned to the assignee of the present invention and which are incorporated herein by reference. Each of the tracks 30 on opposite sides of the row of cylinders 22 may support a riveting machine to traverse the wing panel length so that two or more wing riveters 14 may work on the same wing panel 10 simultaneously from opposite sides.

As the riveting machine 14 traverses the length of the wing panel 10, the pistons along with the formers must in turn be lowered out of the way of the lower tooling head 18 as it passes the positions of the respective formers. Thus, as illustrated in FIG. 1, the outer two of the cylinders 22 shown in FIG. 1, along with the remaining cylinders provided for supporting the wing panel, support the respective piston rods 24 in an up position to support the wing panel 10 while the middle piston rod 24 has been lowered so that The tooling head 18 may pass the position thereof. Thereafter, the middle piston rod is raised back to the up position and the adjacent piston rod is lowered for passage of the lower tooling head 18 by its position, and this continues over the length of the wing panel with each piston rod being lowered in turn for passage of the lower tooling head 18 and then raised back to the up position after the riveter has cleared the cylinder area. Sensors 32 are suitably positioned along the length of the wing panel to sense the approach of the lower tooling head 18 to a respective position of a former 28 and initiate lowering of the respective piston rod 24 to the down position and to suitably signal for raising of the respective piston rod 24 to the up position after the lower tooling head 18 has passed the respective position, as described more fully hereinafter.

The piston rods 24 are each raised to a predetermined height, and the formers 28, which may be customer supplied, are calibrated to conform to the contour of the airfoil 10 and thus adjust for any variations of the height at which the airfoil is to be supported so that, at the up position, the load of the airfoil 10 is borne equally by the plurality of cylinders 22. The cylinders 22 are locked in the up position for riveting as described in greater detail hereinafter.

The wing panel 10 is loaded onto the formers 28 with the piston rods 24 in the down position, as illustrated in FIG. 2. Loading thusly at floor level allows loading to be conducted easier and safer. The key to preventing loss of geometry of the wing panel when being raised to the work position and lowered is to raise and lower evenly. Thus, in accordance with the present invention, the piston rods 24 with the loaded wing panel 10 are then raised in synchronism to the up position so that each piston rod 24 bears its share of the load throughout the raising process, i.e., such that throughout the raising process the individual piston rods are raised so that their heights are within perhaps ¼ inch of the desired height at any given time, as will be described in greater detail hereinafter. The piston rods 24 are also lowered in such a synchronized manner so that during the raising and lowering of the wing panel 10 it will be sufficiently supported throughout its length so as not to lose geometry.

Referring to FIG. 2, each of the cylinders is contained within a pit, illustrated at 36, which is below the level of the floor 38. The pit 36 is suitably lined with a concrete floor 40, concrete walls 42, and a concrete ceiling 44 at floor level having a circular opening, illustrated at 46, therein through which the cylinder 22 extends, the pit 36 allowing the piston rod 24 (i.e., the upper end thereof) to be retracted to near ground level for easily and safely mounting the wing panel 10 after which the piston rod 24 may be raised to the up position for riveting thereof. The pit floor 40 may contain a suitable drainage ditch 41. The pit ceiling 44 may contain a suitable passage or conduit 45 for routing wires from the sensor 32 into the pit.

A circular plate 48 overlies the opening 46. Referring to FIG. 5, a steel tube 52 lines the bore of the opening 46 and a circular steel rim 54 is inset into the upper surface of the concrete ceiling 44 and surrounds the opening 46 and is welded or otherwise suitably attached to the tube 52. The plate 48 is attached to the circular rim 54 such as by a plurality of studs 56 including hex nuts 58 and jam nuts 60. After leveling and alignment of all cylinders, suitable grouting material 61 is placed between plates 48 and 54 to secure final position. The cylinder 22 extends upwardly through an opening 63 in the plate 48 and is joined to the body of the latch mechanism 62, as will be discussed in greater detail hereinafter. The latch mechanism body has cross-section dimensions greater than the diameter of opening 63 so that the cylinder 22 depends from and is supported by the plate 48 so that it may be suitably vertically aligned as discussed hereinafter. The latch mechanism 62 is provided to effect a mechanical lock of the piston rod 24 in the up position as discussed in greater detail hereinafter.

Figure 3:
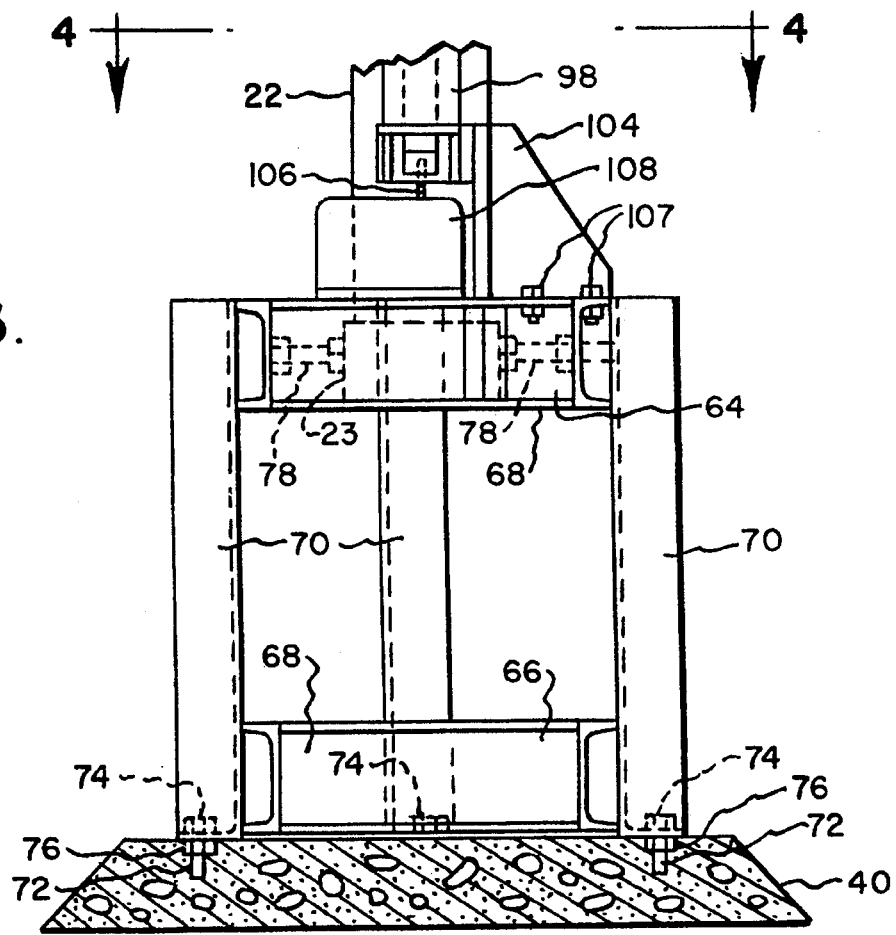
FIG. 3 is a more detailed side view of a portion of the cylinder of FIG. 2.

Referring to FIGS. 3 and 4, a generally square flange 23 is welded or otherwise suitably attached to the bottom of cylinder 22. A pair of vertically spaced upper and lower frames for aligning and stabilizing the position of the cylinder 22 are illustrated at 64 and 66 respectively. Each of these frames 64 and 66 comprises four channel irons 68 welded or otherwise suitably attached together so as to be square in cross-section corresponding to the square cross-section of flange 23. The channel irons 68 of the upper frame 64 are oriented parallel to the four outer walls of the flange 23 respectively. Three steel angle anchoring posts 70 extend vertically alongside both of the frames 64 and 66 along the outer sides of the respective channel irons 68 and are welded or otherwise suitably attached thereto and are anchored to the pit floor 40 by suitable means such as, for example, foundation studs 72, which may be epoxy-type anchors, with hex nuts 74 and jam nuts 76. Thus, the frames 64 and 66 are firmly fixed to the pit floor 40.

The position of the flange 23 relative to the frame 64 and thus vertical alignment of the cylinder is adjusted by means of four adjusting screws 78 which are mounted to the channel irons 68 respectively of the upper frame 64 and engage the respective walls of the flange 23. Adjusting screws 78 may, for example, be flathead set screws having jam nuts 80 which engage the respective channel irons 68. The vertical orientation of the piston rod 24 may thus be aligned with the adjusting screws while using a precision level on the piston rod 24 visually or optically with a theodolite.

Suitably mounted to the upper end of the piston rod 24, as shown in FIG. 5, (below and in engagement with the flange 34) is a bracket 86 which has a portion 88 which extends radially outwardly relatively to the piston rod 24 to support an anti-rotation rod 90. The upper end portion of the anti-rotation rod 90 passes through an aperture 92 in the bracket portion 88 and is attached by suitable means such as a cap screw 94.

The anti-rotation rod 90 passes through aperture 95 in plate 48 and moves up and down within cylindrical housings 96 and 98 with the piston rod 24. Housing 96 extends above plate 48 and is suitably connected thereto such as by flange 97 and bolts 99. Housing 98 extends below plate 48 and is suitably attached thereto such as by welding to plate 48 utilizing weld bushing 105. Rod 90 is guided in housing 96 by a suitable low-friction bushing 103 such as, for example, a Super Plus ball bushing marketed by Thomson Industries, Inc. of Port Washington, N.Y. Alignment of anti-rotation rod 90 as the cylinder is aligned is maintained as plate 48, weld bushing 105 and hence housing 98 are all integral components of the cylinder assembly 22. A bracket 104 is welded or otherwise suitably attached to the lower end of housing 98 and attached by bolts 107 or other suitable means to the brackets 68 for support of the lower anti-rotation rod housing 98.

A hydraulic line to the latch mechanism 62 is illustrated at 182, and an air vent thereto is illustrated at 102.

A cable, illustrated at 106, is suitably connected between the lower end of the anti-rotation rod 90 and an encoder or transducer assembly 108 for providing positional feedback as to the position of the piston rod 24 at any given moment. The encoder 108 may be any suitable conventional linear transducer such as Model PT420150 (631295) provided by Celesco Transducer Products, Inc. of Canoga Park, Calif. The length of anti-rotation rod 90 is such that its lower end remains in the housing 98 and thus below the plate 48. The cable 106, being attached to the bottom of the anti-rotation rod, thus remains in the pit 36 so as not to be exposed to the environment or people loading or unloading wing panel 10. The cable 106 is pulled from the encoder 108 as the piston rod moves upwardly and is suitably retracted back into the encoder 108 during downward movement of the piston rod.

Figure 7A:
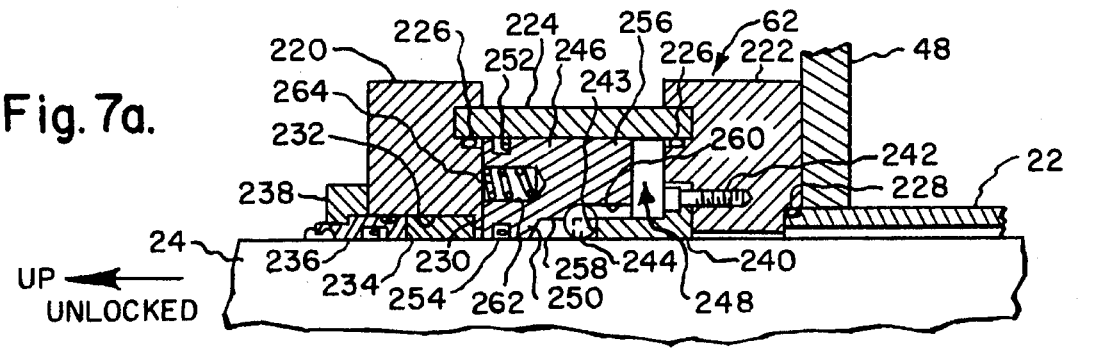
FIG. 7a is a half longitudinal sectional view of apparatus for locking the cylinder in the up position, shown in the unlocked position.
Figure 7B:
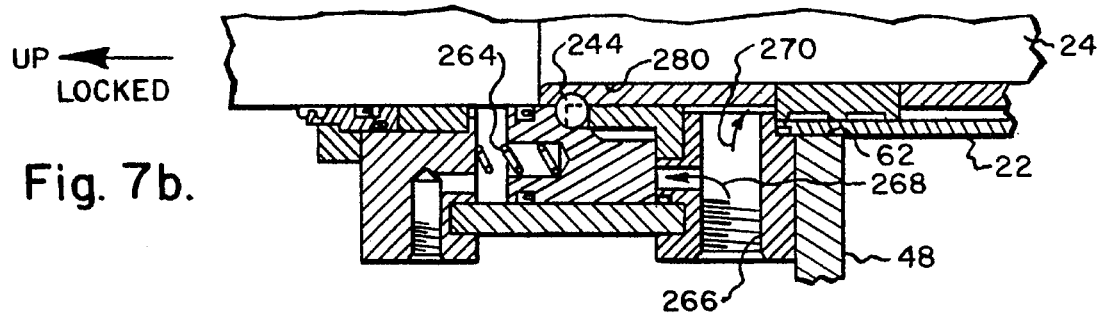
FIG. 7b is a view similar to that of FIG. 7a showing the locking apparatus in the locked position.

Referring to FIGS. 7a and 7b, there is shown in section the latch mechanism 62 in the unlocked and locked positions respectively. The upper end of the cylinder 22 is received through plate 48, and the piston rod 24 (shown unsectioned), extending from the upper end of the cylinder 22, passes through spaced rectangular housing members 220 and 222 which are joined radially outwardly of the piston rod 24 by a ring member 224 to define a space between the members 220, 222, and 224 and the piston rod 24. The edge portions of the ring member 224 are received in circular slots in the respective sides of the housing members 220 and 222 respectively and the connection sealed by O-rings 226 or other suitable means. An O-ring 228 or other suitable means provides a seal between the housing member 222 and the cylinder 22. Housing member 220 has an inner surface 232 which is spaced from the piston rod 24 and a lower ridge 230 extending inwardly toward the piston rod 24 from the surface 232. A suitable bearing 234 is provided within the space between surface 232 and the piston rod 24 and held in position by packing sleeve 236 and circular member 238.

An L-shaped ring member 240 has a base which is received in a notch of member 222 and attached thereto by a plurality of screws 242 or other suitable means. Member 240 extends upwardly adjacent piston rod 24 to an upper end portion which has a plurality of circumferentially spaced notches 243 for receiving a plurality of balls 244 respectively.

A circular latch piston 246 is received in the space 248 defined between members 220, 222, 224, and 240 and piston rod 24 for vertical movement therein and has an upper end portion 250 which sealingly engages member 224 and piston rod 24 by O-rings 252 and 254 respectively or other suitable means. The radially outer surface of latch piston 246 extends along the radially inner surface of ring 224, and the radially inner surface of the upper end portion 250 extends along the piston rod surface. The lower end portion 256 of latch piston 246 has an intermediate radially inner surface 258 which is radially spaced from the piston rod 24 by a distance which is less than the diameter of the balls 244 and is generally radially co-extensive with the radially outer surface of the upper portion of member 240. Lower latch piston end portion 256 also has a lower radially inner surface 260 which is spaced from the piston rod 24 by a distance equal at least to the diameter of balls 244 and spaced from the radially outer surface of the upper portion of member 240 by a distance which is less than the diameter of balls 244 so that the balls 244 remain entrapped between lower end portion 256 and the piston rod 24.

A series of holes 262 is provided in the upper surface of latch piston 246 and each receives a spring 264 which bears against the bottom of the respective hole 262 and the lower surface of housing member 220 to bias the latch piston 246 to the down or "locked" position shown in FIG. 7b.

The lower end portion of the piston rod 24 above the piston 82 has a reduced diameter and to which a sleeve 278 is suitably attached, the outer diameter of the sleeve 278 being equal to the piston rod diameter. Another sleeve 276 is suitably attached below the piston 82, its outer diameter also being equal to the piston rod diameter so that the piston rod has a constant effective diameter over its length. A plurality of circumferentially spaced apertures, illustrated at 280, are provided in the sleeve 278 for receiving the respective balls 244 to therefore lock the piston rod 24 in the up position. The depth of the apertures 280 is less than the ball diameter. As the piston rod 24 moves upwardly, the balls 244 fall radially inwardly into the apertures 280 to thereby prevent downward movement of the piston rod 24 as long as the balls are in the apertures 280. Movement of the balls into the apertures 280 allows downward movement of latch piston 246 so that the intermediate surface 258 thereof bears against the balls 244 to lock them in position for preventing downward movement of the piston rod 24.

Hydraulic line 182 (FIG. 5) connects to hydraulic inlet 266 in housing member 222 to apply hydraulic pressure, as illustrated at 268, against the lower surface of latch piston 246 to overcome the force of spring 264 and raise the latch piston 246 to the position shown in FIG. 7a wherein the balls 244 are allowed to move radially outwardly to surface 260 thus clearing the piston rod apertures 280 so that the piston rod 24 can move downwardly. At the same time hydraulic pressure is applied, as illustrated at 270, against the top of cylinder piston 82 for forcing the piston rod 24 downwardly.

The fragile nature of the wing panel 10 requires that all of the piston rods 24 be precisely raised so as to bear equal shares of the load at each moment as they are raised to the up position and lowered to the down position. In order to provide such precise control, the cylinders 22 are preferably of the hydraulic type so that the hydraulic fluid flow to and from the cylinders can be precisely controlled. Since telescoping hydraulic cylinders are not considered to be sufficiently controllable due to their telescoping nature, the hydraulic cylinders 22 are of the single-rod type to provide the more exact control necessary to ensure precisely coordinated movements of the piston rods 24. Thus, the cylinder 22 may have a 6-inch diameter bore and a single piston rod 24 having a diameter of perhaps 5.5 inches and a stroke of perhaps about 109 inches requiring a pit depth of perhaps about 138 inches. The diameter of the pit opening 46 may perhaps be 24 inches. With such a construction, the former 28 may be perhaps about 21 inches above the floor level 38 when loaded with the cylinder in the down position, as illustrated in FIG. 2.

Figure 10:
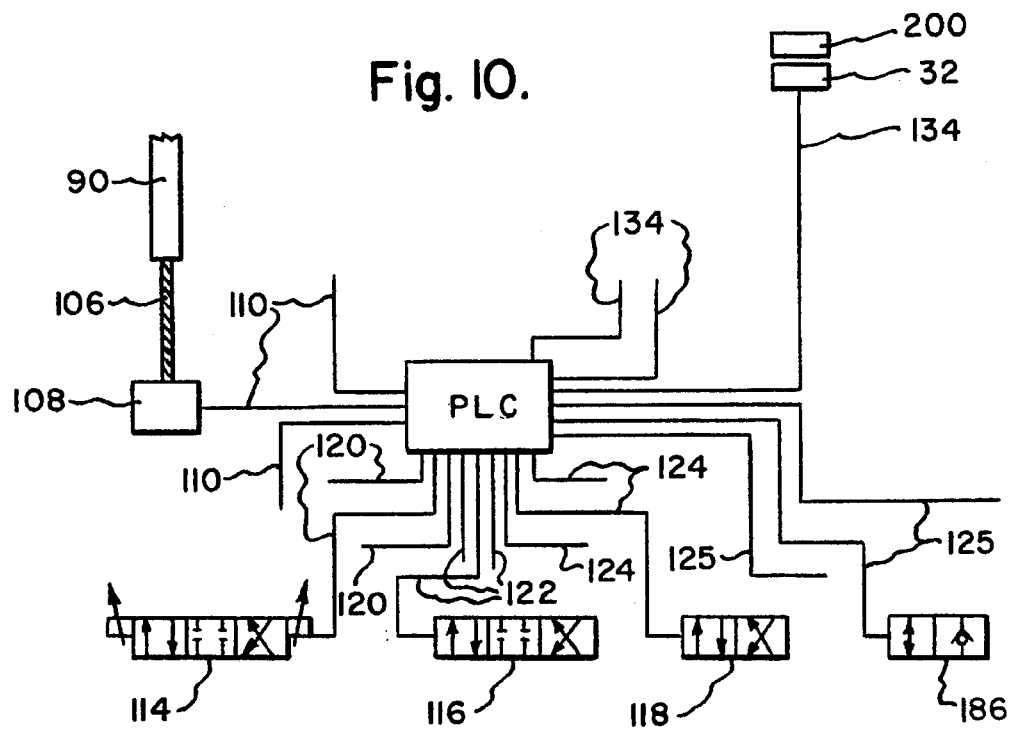
FIG. 10 is a schematic view illustrating the electronic controls for the apparatus.
Figure 11:
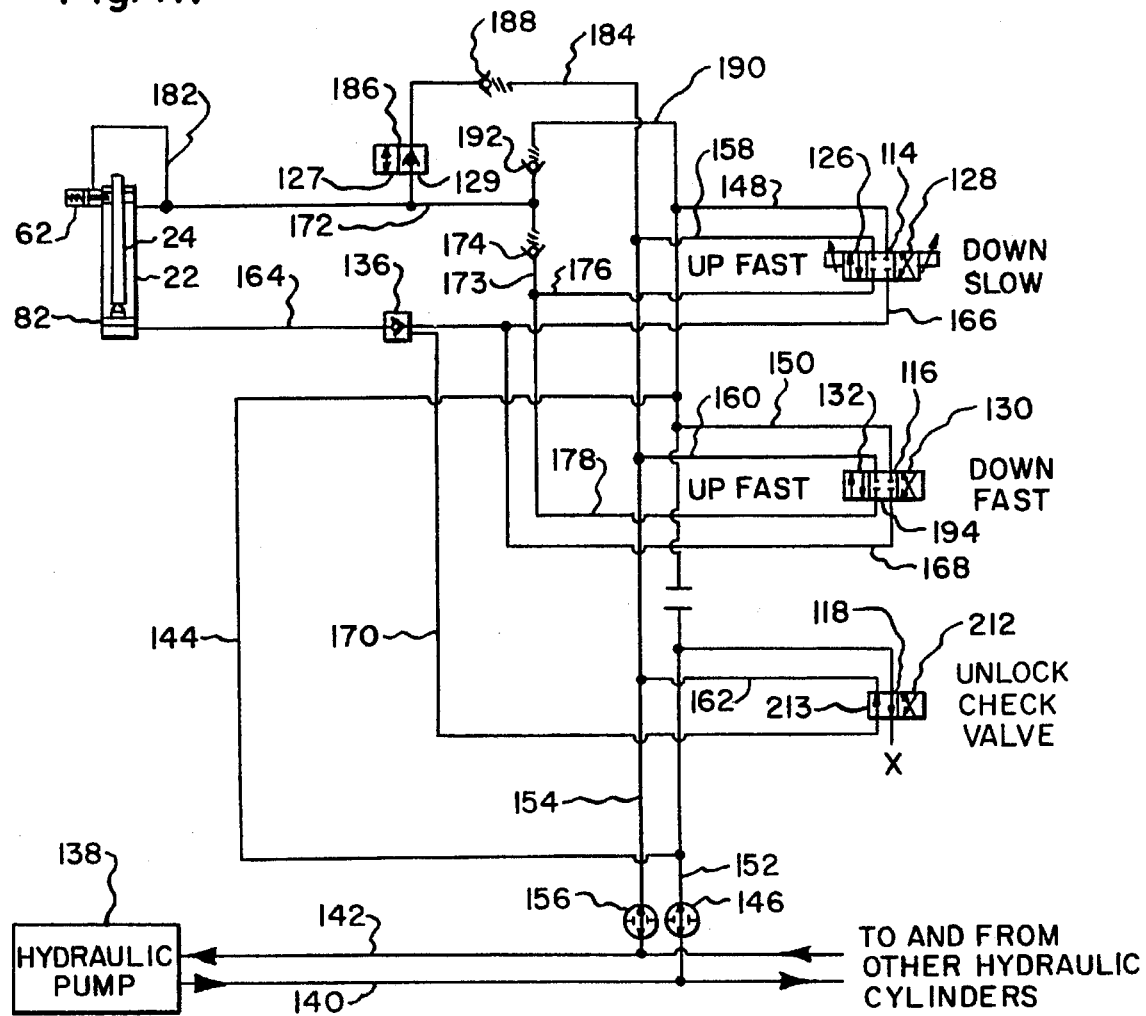
FIG. 11 is a schematic view illustrating hydraulic flow for precisely coordinating piston movement of the hydraulic cylinders.

Referring to FIGS. 10 and 11, there is illustrated schematically the system for precisely controlling the hydraulic fluid flow to the cylinders 22 for achieving precise coordination of up and down movement of the piston rods 24 thereof.

Referring to FIG. 10, the encoder 108 provides electrical pulses through line 110 to a programmable logic controller (PLC) 112, the number of pulses received by the PLC 112 by a given time indicating the piston rod position at that point in time. A suitable PLC 112 may, for example, be Model 5/25 provided by Allen-Bradley Corporation of Milwaukee, Wis. Valves 114, 116, 118, and 186 are hydraulic valves controlled by PLC 112 via lines 120, 122, 124 and 125, respectively. PLC 112 is suitably programmed in accordance with principles commonly known to those of ordinary skill in the art to which this invention pertains. PLC 112 individually controls each of the valves 114, each of the valves 116, each of the valves 118, and each of the valves 186 for the plurality of cylinders 22. FIG. 10 thus illustrates lines 120, 122, 124 and 125 which connect the PLC 112 to the valves 114, 116, 118, and 186 respectively for three different cylinders. Thus, hydraulic fluid flow for control of each of the cylinders is individually controlled from the single PLC receiving feedback from the respective encoders 108. As previously discussed, the wing panel positioning system may of course contain more than three such cylinders each of which individually provides feedback to the PLC 112 and is individually controlled by the PLC.

Valve 114 is a proportional solenoid-operated four-way valve, i.e., the amount the valve is opened is proportional to voltage supplied by the PLC 112 to the solenoid coils thereof. Valves 116 and 118 are solenoid-operated directional control four-way valves, i.e., they are connected to the PLC 112 to be either fully opened or fully closed. Valve 186 is a solenoid-operated two-way valve. The valves 114, 116, and 118 are conventional hydraulic valves which may be supplied, for example, by The Rexroth Corporation of Bethlehem, Pa. under Model Numbers H4WRZ10E185-3X/6A24NZ4, H4WEH25E5X/6BW110NETNOR and 4WE6C5X/BW110NNOR respectively. The valve 186 is a conventional hydraulic valve which may be supplied, for example, by Vickers Modular Controls of Carol Stream, Ill. under Model Number SV3-10-C-8T-115AG.

Referring to FIG. 11, valve 114 has "up slow" and "down slow" positions 126 and 128 respectively for respectively raising and lowering the piston rod 24 for raising a wing panel 10 and lowering it respectively. Valve 116 has "down fast" and "up fast" positions 130 and 132 respectively for rapidly lowering and raising respectively a single piston rod 24 in response to the receipt of signals through line 134 from sensor 32 to allow passage of the lower tooling head 18 of riveting machine 14 by the respective cylinder position. Normally closed pilot-operated check valve 136 is provided to prevent flow of hydraulic fluid from the cylinder and thus insure that it is not lowered from the up position until it is time to lower it. Valve 118 provides hydraulic fluid flow to check valve 136 to open it to the flow of hydraulic fluid from the cylinder for lowering it.

Hydraulic fluid flow is provided by a suitable hydraulic pump 138 through line 140 to each of the hydraulic cylinders 22, and hydraulic fluid is returned from each of the cylinders through line 142 to the tank for the pump 138. A line 152 having shut off valve 146 for each individual cylinder runs from line 140 to respective cylinder 22 for hydraulic flow thereto. A branch line 144 off of line 152 provides fluid flow through lines 148 and 150 to valves 114 and 116 respectively for the respective cylinders. Branch line 282 off of line 152 supplies hydraulic fluid flow to valve 118. A return branch line 154 having shut-off valve 156 for each individual cylinder connects to return line 142 and receives return hydraulic fluid flow from lines 158, 160, and 162 from valves 114, 116, and 118 respectively.

Hydraulic fluid is supplied to and returned from the bottom of the cylinder 22 through line 164, which has pilot-operated check valve 136 therein, via lines 166 and 168 from valves 114 and 116 respectively. Line 170 provides fluid flow for pilot operation of the check valve 136 from valve 118. Fluid flow to and from the top of the cylinder 22 is provided through line 172 which branches into lines 173, 184, and 190. Line 173 has check valve 174 and further branches into lines 176 and 178 to the valves 114 and 116 respectively. Line 190 has check valve 192 and connects to branch line 144. Line 184 has valve 186 and check valve 188 and connects to return line 154. Line 182, which branches from line 172, provides hydraulic fluid flow to the latch mechanism 62 for unlocking the piston rod 24 from the up position.

With the lift cylinder 22 in the down position, as illustrated in FIGS. 2 and 11, and with the wing panel 10 loaded thereon, the wing panel 10 is raised slowly by operation of valve 114 in the "up slow" position 126, in response to a signal by the PLC through line 120. The PLC also maintains valve 116 in the closed position 194 and valve 118 in position 213 during such slow upward movement. Thus, hydraulic fluid is flowed from hydraulic pump 138 through line 140, line 152, line 144, line 148, valve 114, line 166, check valve 136, and line 164 to the bottom of the respective cylinder 22 for raising thereof. Meanwhile, hydraulic fluid from above the piston 82 is flowed through line 172, check valve 192, line 190, and to line 148 to be combined with the hydraulic fluid being pumped into the bottom of the cylinder to provide a regenerative circuit providing increased hydraulic fluid volume. Check valve 174 prevents the flow of this fluid into line 173, and the valve 116 is in the closed position 194, in response to a signal by the PLC. When the piston rod 24 reaches the up position, latch mechanism 62 engages the piston rod to lock it in position. In addition, PLC 112 signals valve 186 through line 125 for operation thereof in position 127 so as to relieve any fluid pressure in line 172 through line 184, check valve 188, line 154, and line 142 to the tank of hydraulic pump 138 to thereby prevent a build-up of pressure in line 182 which may inadvertently operate latch mechanism 62 to release the piston rod 24. Valve 118 remains in position 213 to relieve any pressure in line 170 through lines 162, 154, and 142 to the tank of pump 138 so that normally closed check valve 136 is not inadvertently opened. This is provided to insure that the piston rod 24 is held in the up position until it is mime to lower it.

The ideal rate of movement of the piston rod of a theoretical ideal cylinder for lifting and lowering the wing panel 10 is programmed into the PLC 112 in accordance with principles commonly known to those of ordinary skill in the art to which this invention pertains. During lifting as well as lowering of the wing panel 10, the PLC 112 continuously compares the position of each individual piston rod 24 to the position of the theoretical piston rod of the ideal cylinder pre-programmed into the PLC and signals the valve 114 to accordingly increase or decrease the hydraulic fluid flow therethrough so as to cause each piston rod to be raised and lowered precisely to the rate at which the theoretical ideal cylinder is raised or lowered. Thus, the output of each individual encoder 108 is continuously compared with the output of the theoretical ideal cylinder and adjusted accordingly. The PLC thus regulates fluid flow to each of the cylinders 22 to raise them individually at the same rate as the ideal cylinder is raised so that all of the cylinders are raised evenly to bear their respective loads of the wing panel.

Referring to FIGS. 8 and 9, a plurality of pneumatic cylinders 196 suitably attached such as by bolts 198 to the frame of the riveting machine 14 are provided to position an elongate target 200 of ferrous material in proximity to the sensor 32. The target 200 may be attached by suitable means such as bolt 206 to an adapter plate 284 which is attached in turn to the cylinders 196 by means of an alignment coupling 208. Sensor 32, which is suitably embedded in the concrete pit lining to be flush with the surface of floor 38, is a proximity switch providing a magnetic field which is affected by the target 200 to provide a signal through line 134 to the PLC 112 indicating the approach of the riveting heads 16 and 18 to the position of the respective former so that the PLC 112 can initiate lowering of the respective cylinder to the down position for passage of the tooling head during riveting. In order to position the target 200 to trip the switch 32, the pneumatic cylinders 196 lower the target 200 to the position shown in FIG. 8 wherein the distance between the target 200 and the proximity switch 32, illustrated at 202, is sufficiently close, perhaps about 0.28 inch, for the target 200 to affect the magnetic field of switch 32 to provide the signal. If it is desired to move the riveting machine 14 along the track 30 for other purposes which do not require the respective hydraulic cylinders 22 to be lowered, the pneumatic cylinders 196 may be operated to raise the target 200 to a retracted position, illustrated in FIG. 9, wherein the target 200 is spaced from the proximity switch 32 a distance, illustrated at 204, equal to perhaps about 2.09 inches or more. At this height, the target 200 does not affect the magnetic field of the proximity switch 32 enough to trip it. A suitable linear alignment coupler to serve as coupling 208 may be model S-2 provided by Hanna of Chicago, Ill. Hall effect switches 210 are provided to indicate whether pneumatic cylinders 196 are extended or retracted. Both the hall effect switches 210 and the pneumatic cylinders 196 are products that may be Model HC and F0-125-1.500-FL-LM respectively provided by Bimba of Monee, Ill. For a riveting pass of the riveting machine 14, the target 200 is positioned in the sensing position of FIG. 8 by suitably operating pneumatic cylinders 196.

When the target 200 comes into proximity with the sensor 32, a signal is transmitted along line 134 to the PLC 112 which is programmed to, in response, signal valve 186 for operation in position 129 to prevent fluid flow from line 172 into line 184. The PLC 112 also sends signals through the respective lines 120 and 122 for positioning the hydraulic valves 114 and 116 in the "down slow" and "down fast" positions 128 and 130 respectively. This effects hydraulic fluid flow from hydraulic pump 138 through line 140, line 144, and both of lines 148 and 150, then through valves 114 and 116 respectively, through both of lines 176 and 178, then through line 173, check valve 174, and line 172 to provide fluid flow into the cylinder above the piston 82 to drive the piston downwardly fast. At the same time, hydraulic fluid flows through line 182 to release the latch mechanism 62 to permit downward movement of the piston 82. PLC 112 also sends a signal through the respective line 124 to valve 118 for movement thereof to the unlock check valve position 212 so as to effect fluid pressure from the hydraulic pump 138 through line 140 and branch line 152, line 282, through the valve 118 and through line 170 to the pilot-operated check valve 136 to open the check valve 136 to return hydraulic fluid from the bottom of the cylinder 22 through line 164 and check valve 136 to lines 166 and 168, then through valves 114 and 116 respectively, then lines 158 and 160 respectively, through line 154, through shutoff valve 156, and into return line 142 and to the tank for the hydraulic pump 138.

The length of the target 200 is selected based on the distance which the riveting machine 14 should travel before it is time for the respective cylinder 22 to be raised to the up position, i.e., after the upper and lower heads 16 and 18 respectively have passed the position of the respective former. When there is an absence of a signal by the proximity switch indicating the proximity of the target 200, the PLC 112 is programmed in response to signal the valves 114 and 116 through respective lines 120 and 122 for positioning thereof in the "up slow" and "up fast" positions 126 and 132 respectively. This effects hydraulic fluid flow from the hydraulic pump 138 through line 140, shutoff valve 146, line 144, both Of lines 148 and 150, through the valves 114 and 116 respectively, through lines 166 and 168 respectively, through check valve 136, and through line 164 to the bottom of the respective cylinder 22 for raising the piston rod 24 rapidly. Fluid flow from the top of the cylinder 22 passing through line 172 again passes through check valve 192 into the regenerative line 190 to lines 148 and 150 for combining with the fluid from the pump for increasing the total fluid flow to the bottom of the cylinder. During this time, valve 186 remains in position 129 blocking the flow of hydraulic fluid into line 184 and hence back to the tank of hydraulic pump 138.

As the piston rod 24 approaches the up position and a predetermined approach or deceleration point is reached, as sensed by the PLC 112 from encoder 108, the PLC 112 is programmed to signal the valve 116 through line 122 for movement to the closed position 194 resulting is a preprogrammed regulated slowed movement of the piston rod 24 from the approach point to the up position. When the up position is reached, the piston rod 24 is locked in the up position by the latch mechanism 62. The PLC signals valve 186 through line 125 to switch to the open position 127 so that any pressure in line 182 is relieved to the hydraulic pump tank through line 172, valve 186, check valve 188, line 184, line 154, shutoff valve 156, and line 142.

When it is time to lower the wing panel 10, the PLC 112 signals valves 186 to the closed positions 129 and signals through the respective lines 120 the valves 114 to switch to the "down slow" positions 128 (with valves 116 in the closed positions 194) to effect fluid flow from the hydraulic pump 138 through line 140, shut-off valve 146, line 144, line 148, valve 114, line 176, check valve 174, and line 172, to the top of the cylinder, regulating the flow rate to each cylinder with reference to the theoretical ideal cylinder so that all of the cylinders bear their shares of the load throughout the lowering process. Fluid flow through lines 182 effects release of the respective piston rods 24 by the respective latch mechanisms 62 so as to allow lowering thereof. At the same time, PLC 112 signals valves 118 to positions 212 to provide fluid pressure through respective lines 170, as previously discussed, to unlock respective check valves 136 to effect fluid flow from the bottoms of the respective cylinders to the hydraulic pump tank.

When the down position is reached, the riveted wing panel may be easily and safely removed from the cylinders.

It should be understood that, while the invention has been described in detail herein, the invention can be embodied otherwise without departing from the principles thereof, and such other embodiments are meant to come within the scope of the present invention as defined by the appended claims.

What is claimed is:

1. A method comprising the steps of:
    a. loading a workpiece on piston rods of a plurality of hydraulic cylinders spaced along the length of the workpiece;
    b. operating the hydraulic cylinders to raise the workpiece to a position for conducting operations thereon; and
    c. controlling hydraulic fluid flow to and from the hydraulic cylinders for synchronizing the movements of the piston rods so that each of the piston rods bears its share of the workpiece load throughout raising of the workpiece including inputting to a controller the position of each of the piston rods at each of increments of time during raising of the workpiece and further including operating the controller to output signals for controlling the speed of each of the piston rods individually in response to the inputted position thereof.

2. A method according to claim 1 further comprising individually operating the hydraulic cylinders for movement in turn of the piston rods downwardly for passage of tooling below the workpiece while remaining ones of the hydraulic cylinders support the workpiece and for movement in turn of the piston rods upwardly to support the workpiece after passage of the tooling.

3. A method according to claim 1 further comprising locking the piston rods in an up position for supporting the workpiece and supplying hydraulic pressure to unlock the piston rods from the up position.

4. A method according to claim 1 further comprising flowing hydraulic fluid returning from one piston side of at least one hydraulic cylinder during movement of the piston rod thereof to an other piston side thereof for combining with other hydraulic fluid being flowed from a source to said other piston side for effecting movement of the piston rod.

5. A method comprising the steps of:
    a. loading a workpiece on piston rods of a plurality of hydraulic cylinders spaced along the length of the workpiece;
    b. operating the hydraulic cylinders to raise the workpiece to a position for conducting operations thereon; and
    c. comparing an inputted position of each of the piston rods at each of increments of time during raising of the workpiece to a programmed position at the respective increment of time of a piston rod of an ideal cylinder and controlling the speed of the piston rod of each of the hydraulic cylinders individually in response to the difference between the inputted position thereof and the programmed position of the ideal cylinder at each of the increments of time.

6. A method according to claim 5 wherein the workpiece is a wing panel, the method further comprising tacking longitudinal stiffeners to the wing panel and applying formers to the piston rods to extend transversely of the wing panel for support thereof before the step of loading the workpiece, positioning heads of a riveting machine above and below the raised workpiece to traverse the length of the workpiece while riveting the stiffeners to the wing panel, and individually operating the plurality of hydraulic cylinders for movement in turn of the respective piston rods and formers downwardly for passage of a riveting head below the wing panel while the respectively remaining ones of the hydraulic cylinders support the wing panel in the raised position and for movement upwardly of the respective piston rods to the raised position after passage respectively of the riveting head below the wing panel.

7. A method comprising the steps of:
    a. tacking longitudinal stiffeners to a wing panel;
    b. applying formers to piston rods of a plurality of hydraulic cylinders spaced along the length of the wing panel to extend transversely of the wing panel for support thereof;
    c. loading the wing panel on the formers at ground level;
    d. operating the hydraulic cylinders to raise the wing panel to a position for conducting operations thereon;
    e. controlling hydraulic fluid flow to and from the hydraulic cylinders for synchronizing the movements of the piston rods so that each of the piston rods bears its share of the wing panel load throughout raising of the wing panel including inputting to a controller the position of each of the piston rods at each of increments of time during raising of the wing panel and further including operating the controller to output signals for controlling the speed of each of the piston rods individually in response to the inputted position thereof;
    f. positioning heads of a riveting machine above and below the raised wing panel to traverse the length of the wing panel while riveting the stiffeners to the wing panel; and
    g. individually operating the plurality of hydraulic cylinders for movement in turn of the respective piston rods and formers downwardly for passage of a riveting head below the wing panel while the respectively remaining ones of the hydraulic cylinders support the wing panel in the raised position and for movement upwardly of the respective piston rods to the raised position after passage respectively of the riveting head below the wing panel.

\* \* \* \* \*